(12) United States Patent
Kim

(10) Patent No.: US 9,600,469 B2
(45) Date of Patent: Mar. 21, 2017

(54) METHOD FOR DETECTING GRAMMATICAL ERRORS, ERROR DETECTION DEVICE FOR SAME AND COMPUTER-READABLE RECORDING MEDIUM HAVING METHOD RECORDED THEREON

(71) Applicant: SK TELECOM CO., LTD., Seoul (KR)

(72) Inventor: Seunghwan Kim, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/624,929

(22) Filed: Feb. 18, 2015

(65) Prior Publication Data

US 2015/0161096 A1 Jun. 11, 2015

Related U.S. Application Data

(63) Continuation of application No. PCT/KR2013/005403, filed on Jun. 19, 2013.

(30) Foreign Application Priority Data

Aug. 23, 2012 (KR) .......................... 10-2012-0092088

(51) Int. Cl.
G06F 17/27 (2006.01)

(52) U.S. Cl.
CPC .................... G06F 17/274 (2013.01)

(58) Field of Classification Search
CPC .......... G06F 17/2854; G06F 17/30011; G06F 17/30253; G06F 17/3061; G06F 17/2795; G06F 17/30666; Y10S 707/99935

(Continued)

(56) References Cited

U.S. PATENT DOCUMENTS 5,619,410 A * 4/1997 Emori ................. G06F 17/2795
704/7
5,907,836 A * 5/1999 Sumita ................. G06F 17/3061
707/754

(Continued)

FOREIGN PATENT DOCUMENTS

KR 1020050039379 A 4/2005
KR 1020090028219 A 3/2009

(Continued)

OTHER PUBLICATIONS

International Search Report for PCT/KR2013/005403 dated Oct. 10, 2013, citing the above reference(s).

*Primary Examiner* — Michael Colucci
(74) *Attorney, Agent, or Firm* — Hauptman Ham, LLP

(57) ABSTRACT

An apparatus for detecting grammatical errors includes: a sentence analyzer to break up an input sentence into units of morphemes; an example builder to break up example text into units of morphemes and build an example-based index database (DB); and an error detector to generate morpheme sequences by binding the morphemes broken up from the input sentence in a preset window (n-window) size, the generated morpheme sequences comprising forward morpheme sequences and backward morpheme sequences, determine frequencies of appearance of morpheme sequences identical to the forward morpheme sequences and backward morpheme sequences by searching the example-based index DB, and detect grammatical errors in the input sentence by combining the determined frequencies of appearance.

20 Claims, 7 Drawing Sheets

(a) Input sentence : I would like to live in a city.

(b)

| | I | would | like | to | live | in | a | city |
|---|---|---|---|---|---|---|---|---|
| score_f(Wm) | 1.0000 | 0.0127 | 1.3333 | 1.2347 | 0.0334 | 0.2454 | 0.2454 | 0.1061 |
| score_b(Wm) | 0.7135 | 3.0560 | 0.0392 | 0.6826 | 0.0610 | 1.5458 | 0.0255 | 1.0000 |
| score(Wm) | 0.8568 | 1.5344 | 0.6863 | 0.9587 | 0.0472 | 1.1720 | 0.1354 | 0.5531 |

(c)

(58) Field of Classification Search
USPC ........ 715/838, 778; 707/784, 754, 737, 727, 707/715, 709, 708, 706; 704/9, 7, 251, 2
IPC .................. G06F 17/2854, 17/30011, 17/30253, 17/3061, 17/2795, 17/30666; Y10S 707/99936, 707/9935
See application file for complete search history.

(56) References Cited

U.S. PATENT DOCUMENTS

| | | | | |
|---|---|---|---|---|
| 7,725,424 | B1* | 5/2010 | Ponte | G06F 17/30867 707/715 |
| 7,801,917 | B2* | 9/2010 | Gilmour | G06F 17/3061 707/784 |
| 7,865,496 | B1* | 1/2011 | Schiller | G06F 17/30699 707/708 |
| 7,941,420 | B2* | 5/2011 | Chitrapura | G06F 17/30896 707/709 |
| 8,340,957 | B2* | 12/2012 | Gallagher | G06F 17/30616 704/1 |
| 9,002,816 | B2* | 4/2015 | Omura | G06F 17/3064 707/706 |
| 9,015,161 | B2* | 4/2015 | Kuroiwa | G06K 9/00442 707/737 |
| 2007/0094615 | A1* | 4/2007 | Endo | G06F 17/2211 715/838 |
| 2008/0115080 | A1* | 5/2008 | Matulic | G06F 17/30253 715/778 |
| 2008/0162137 | A1* | 7/2008 | Saitoh | G10L 15/22 704/251 |
| 2009/0030914 | A1* | 1/2009 | Goto | G06F 17/30719 |
| 2010/0049705 | A1* | 2/2010 | Ochi | G06F 17/30011 707/727 |
| 2010/0070261 | A1* | 3/2010 | Jin | G06F 17/2755 704/2 |

FOREIGN PATENT DOCUMENTS

| | | |
|---|---|---|
| KR | 1020100000047 A | 1/2010 |
| KR | 1020100031800 A | 3/2010 |
| KR | 1020120041567 A | 5/2012 |

* cited by examiner

METHOD FOR DETECTING GRAMMATICAL ERRORS, ERROR DETECTION DEVICE FOR SAME AND COMPUTER-READABLE RECORDING MEDIUM HAVING METHOD RECORDED THEREON

CROSS-REFERENCE TO RELATED APPLICATION

The present application is a continuation of International Application No. PCT/KR2013/005403 filed on Jun. 19, 2013, which is based on, and claims priority from, Korean Patent Application No. 10-2012-0092088 filed on Aug. 23, 2012. The disclosures of the above-listed application are hereby incorporated by reference herein in their entirety.

TECHNICAL FIELD

The present disclosure relates to detecting a grammatical error, more particularly, a method and an error detecting apparatus of determining the frequency of appearance of morpheme sequences identical to forward morpheme sequences and backward morpheme sequences of a written sentence and detecting an error based on a higher frequency of appearance.

BACKGROUND

The statements in this section merely provide background information related to the present disclosure and do not constitute prior art.

Recently, in college entrance examinations and domestic large corporations, grade-oriented evaluation is changing to evaluate actual English proficiency in speaking/writing. In an English ability test, a writing evaluation system is being also introduced to evaluate a writing ability.

The inventor(s) has noted that an existing writing evaluation system grammatically analyzes an already-written sentence and evaluates whether or not the written sentence is grammatically correct through error detection. At this time, the process of analyzing the written sentence involves analyzing morphemes of the sentence and tagging the morphemes with parts of speech. The inventor(s), however, has noted that an existing morpheme analyzing and part-of-speech tagging device depends upon only part-of-speech sequence information without considering vocabulary, parts of speech, meanings, and contextual co-occurrence relations of surrounding words. The inventor(s) has experienced that the accuracy of the device is significantly degraded.

The inventor(s) has noted that to improve the accuracy of the device, an error detection method of complementarily applying rule information and statistical information of vocabulary using a dictionary, a language model, etc. in which peripheral language rules and word context information are constructed.

The inventor(s) has noted that the language model in particular represents a connection relationship between words based on statistical grammatical information using a probability. The language model can be easily extracted from many text sentences of a given field and has high accuracy in error detection. The inventor(s), however, has noted that actual language varies with time and place rather than being standardized rules, and thus often differs from the statistical grammatical information. For example, implied words, Internet terminology, newly established modern words, etc. violate grammar, but is frequently used in real life. In this regard, the inventor(s) has experienced that there is a need of a scheme for accurately detecting grammatical errors based on statistical grammatical information.

SUMMARY

In accordance with some embodiments, an apparatus for detecting grammatical errors comprises a sentence analyzer, an example builder and an error detector. The sentence analyzer is configured to break up an input sentence into units of morphemes. The example builder is configured to break up example text into units of morphemes and build an example-based index database (DB). And the error detector is configured to generate morpheme sequences by binding the morphemes broken up from the input sentence in a preset window (n-window) size, the generated morpheme sequences comprising forward morpheme sequences and backward morpheme sequences, determine frequencies of appearance of morpheme sequences identical to the forward morpheme sequences and backward morpheme sequences by searching the example-based index DB, and detect grammatical errors in the input sentence by combining the determined frequencies of appearance.

In accordance with some embodiments, breaking up an input sentence into units of morphemes; an apparatus for detecting grammatical errors is configured to generate morpheme sequences by binding the broken-up morphemes in an preset window size, the generated morpheme sequences comprising forward morpheme sequences and backward morpheme sequences; determine frequencies of appearance of morpheme sequences identical to the forward morpheme sequences and backward morpheme sequences of the generated morpheme sequences by searching an example-based index database (DB); and detect grammatical errors in the input sentence by combining the determined frequencies of appearance.

DETAILED DESCRIPTION

Figure 1:
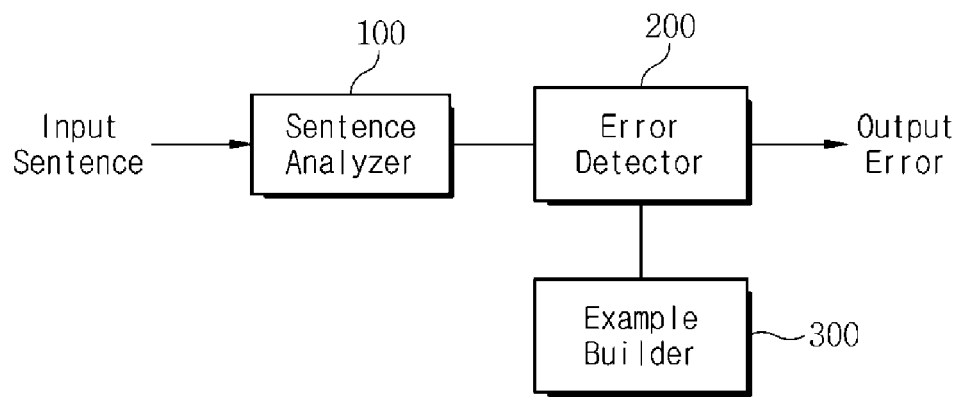
FIG. 1 is a diagram of a constitution of an error detecting apparatus for detecting a grammatical error according to at least one embodiment of the present disclosure.

Hereinafter, exemplary embodiments of the present disclosure will be described in detail with reference to the accompanying drawings. In the following description and the accompanying drawings, when detailed descriptions on the known art related to the present disclosure are determined to unnecessarily obscure the gist of the present disclosure, the detailed descriptions will be omitted. Throughout the drawings, like elements are referred to by like numerals within the limits of the possible.

The terms or words used in the present specification and claims described below are not to be construed as common or dictionary meanings but are to be construed as meanings and concepts in accordance with the technical spirit of the present disclosure based on a principle that the inventor can define terms appropriately for the best explanation of his or her own disclosure. Embodiments described in the present specification and configurations shown in the drawings are merely exemplary embodiments or the present disclosure and do not represent all the spirit of the present disclosure. Thus, it is to be understood that there can be various equivalents and modifications at the filing data of the present disclosure.

Prior to description, an example mentioned in the present disclosure denotes an "example used" in its dictionary meaning, and denotes example text in which a specific word is used in the linguistics field. In particular, an example mentioned in the present disclosure is not a corpus in which sentences are constructed according to standardized grammatical rules, but includes sentences violating standardized rules but used in real life, sentences including various styles of writing, and so on.

Some embodiments of the present disclosure provide a grammatical error detecting method for building an example-based database (DB) by collecting example text including various styles of writing through the Internet or other language transmission media, determining the frequencies of appearance of forward morpheme sequences and backward morpheme sequences of a written sentence, and detecting an error based on a higher frequency of appearance, an error detecting apparatus for the method, and a non-transitory computer-readable recording medium storing the method.

FIG. 1 is a diagram of a constitution of an error detecting apparatus for detecting a grammatical error according to at least one embodiment of the present disclosure.

Referring to FIG. 1, an error detecting apparatus 10 for detecting a grammatical error includes a sentence analyzer 100, an error detector 200, and an example builder 300. Other components of the error detecting apparatus 10, such as the sentence analyzer 100, the error detector 200, and the example builder 300 are implemented by one or more processors and/or application-specific integrated circuits (ASICs).

The sentence analyzer 100 receives written input sentences as data. At this time, the sentence analyzer 100 breaks up the inputted writing (hereinafter, referred to as "input sentences") into units of morphemes, and tags the broken-up morphemes with the corresponding parts of speech. Also, the sentence analyzer 100 analyzes the syntactic structure of each sentence based on the tagged parts of speech, and extracts syntax trees as results of the analysis. At this time, the sentence analyzer 100 transfers the sentences tagged with the parts of speech to the error detector 200 so as to reduce as many errors in syntax analysis as possible.

The error detector 200 generates part-of-speech sequences using n-grams of the sentences received from the sentence analyzer 100, and analyzes the generated part-of-speech sequence based on simple grammatical rules and also based on grammatical rules defined according to connection relationships between adjacent parts of speech at the same time, thereby detecting errors in syntax analysis caused by the connection relationships between adjacent parts of speech as well as simple errors in English composition. In particular, the error detector 200 generates the part-of-speech sequences using n-grams of the tagged parts of speech, and analyzes the generated part-of-speech sequences based on grammatical rules, thereby detecting the errors. In other words, the error detector 200 generates morpheme sequences by binding the broken-up morphemes in an arbitrary (or preset, hereinafter referred to as "arbitrary") window (n-window) size.

In addition, the error detector 200 determines the frequencies of morpheme sequences identical to forward morpheme sequences and backward morpheme sequences of the generated morpheme sequences by searching an example-based index database (DB). When the frequencies of appearance of the forward morpheme sequences are different from the frequencies of appearance of the backward morpheme sequences, the error detector 200 detect errors based on the higher frequencies of appearance. In particular, the error detector 200 calculates suitability scores using higher frequencies of appearance, and detects grammatical errors by determining whether the suitability scores are smaller than a threshold, or whether the suitability scores are smaller than the threshold by a predetermined value or more.

The example builder 300 collects example text from a plurality of sentences exposed through language transmission media and builds the high-capacity index DB to be used in error detection. In particular, the example builder 300 collects example text from a plurality of sentence sets exposed through the language transmission media and builds the high-capacity index DB to be used in error detection. The index DB built in this way is stored as statistical information based on various examples.

The error detecting apparatus 10 detects errors in the input sentences based on the example-based statistical information. Also, for error detection, the error detecting apparatus 10 does not search the input sentences in their entirety, but uses an n-gram search scheme of binding sections in an arbitrary (preset) window size and comparing and searching for statistical information in units of sections.

In general, the n-gram search scheme includes a bigram for classifying sections into units of two windows, a trigram for classifying sections into units of three windows, etc., in which the frequencies of appearance of one or two previous contexts are taken into consideration according to a window size.

Figure 2:
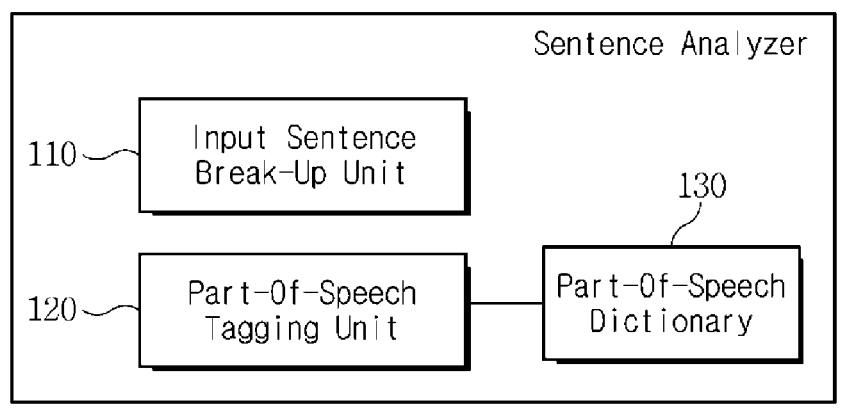
FIG. 2 is a diagram of a constitution of a sentence analyzer according to at least one embodiment of the present disclosure.

FIG. 2 is a diagram of a constitution of a sentence analyzer according to at least one embodiment of the present disclosure.

Referring to FIG. 2, as an example, a constitution for detecting a sentence error separately includes the error detector 200 and the sentence analyzer 100. However, the constitution is not limited to the example, and the error detector 200 can be included in the sentence analyzer 100 and implemented as one device.

The sentence analyzer 100 includes an input sentence break-up unit 110, a part-of-speech tagging unit 120, and a part-of-speech dictionary 130 as components for receiving written sentences as data and evaluating the received sentences. In particular, the sentence analyzer 100 breaks up the received sentences into units of morphemes, tags the broken-up morphemes with parts of speech, and analyzes the syntactic structures of the sentences based on the tagged parts of speech. Other components of the sentence analyzer 100, such as the input sentence break-up unit 110, the part-of-speech tagging unit 120, and the part-of-speech dictionary 130 are implemented by one or more processors and/or application-specific integrated circuits (ASICs).

The input sentence break-up unit 110 breaks up the received writing into units of morphemes. Here, sentence break-up denotes an operation of breaking up several sentences into units of sentences based on punctuation marks, such as a period, a question mark, and an exclamation mark. Also, according to morpheme break-up, postpositions are not arranged next to a word due to linguistic characteristics, and thus a morpheme which is the smallest unit of meaning may be a word.

The part-of-speech tagging unit 120 tags the morphemes broken up by the input sentence break-up unit 110 with the corresponding parts of speech. Here, part-of-speech tagging may be performed with reference to the knowledge of the previously stored part-of-speech dictionary 130. For example, the types of parts of speech include noun, verb, preposition, adjective, adverb, article, interjection, and so on. When "I would like to live in the city." is inputted as an example of an input sentence, the input sentence break-up unit 110 breaks up the input sentence into "I," "would," "like," "to," "live," "in," "the," "city," and ".," and the part-of-speech tagging unit 120 tags the broken-up morphemes with noun (I), verb (would), verb (like), preposition (to), verb (live), preposition (in), article (the), noun (city), etc. in sequence.

Figure 3:
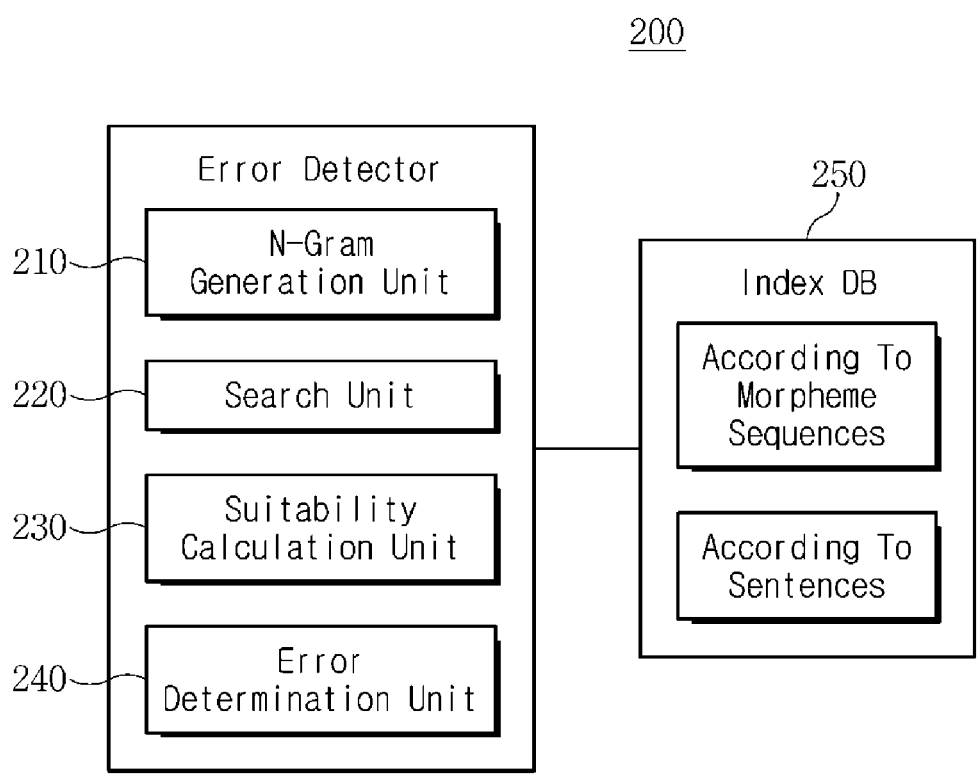
FIG. 3 is a diagram of a constitution of an error detector according to at least one embodiment of the present disclosure.
Figure 4:
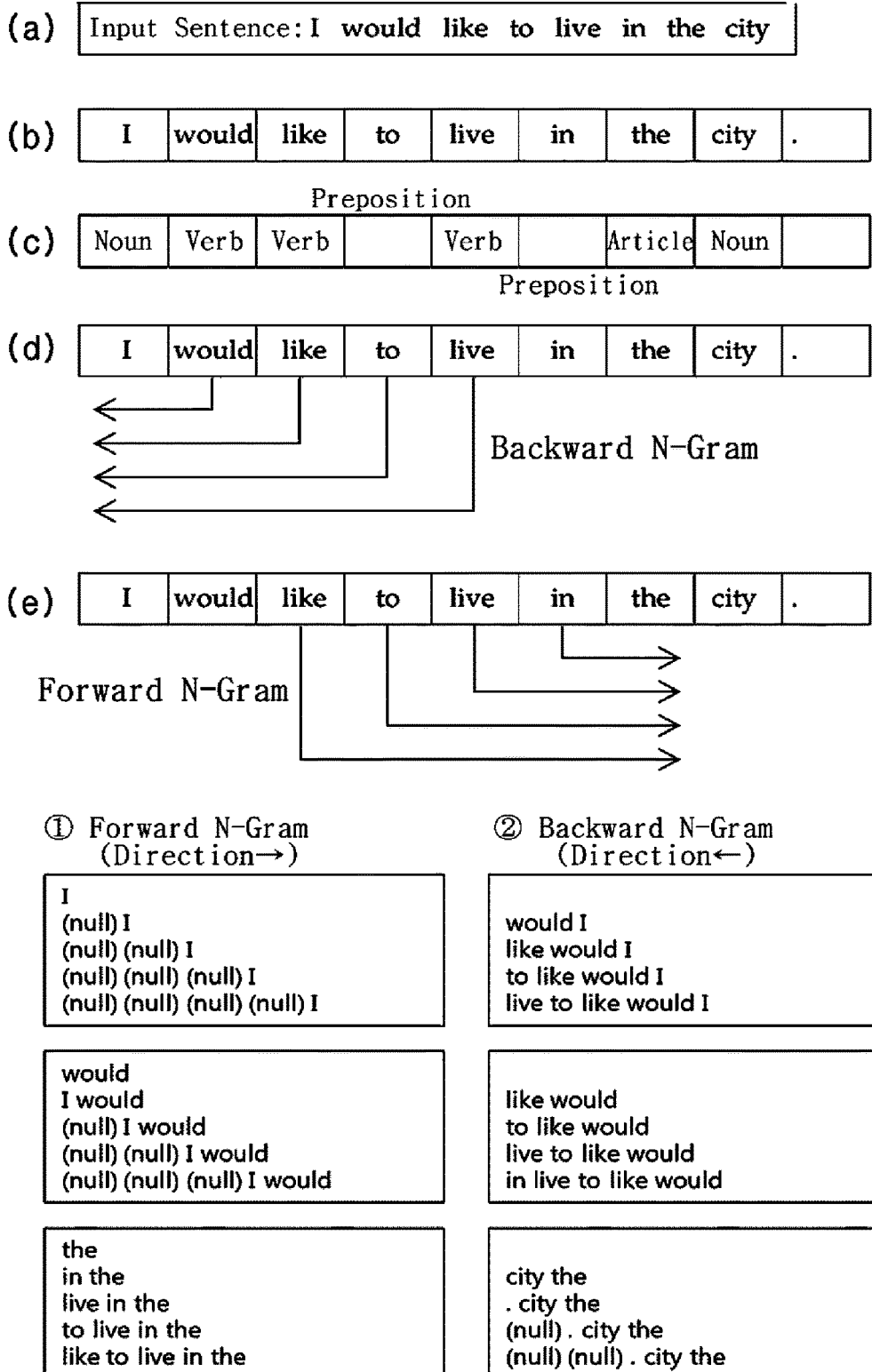
FIG. 4 is an example diagram of functions performed by respective components of FIG. 3.
Figure 5:
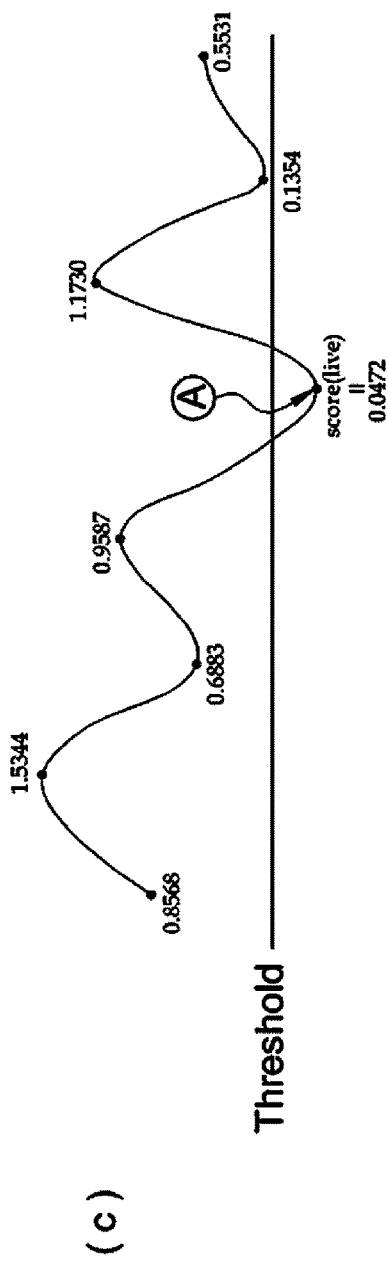
FIG. 5 is an example diagram showing result values of the components of FIG. 3.

FIG. 3 is a diagram showing a constitution of an error detector according to at least one embodiment of the present disclosure, FIG. 4 is an example diagram illustrating functions performed by respective components of FIG. 3, and FIG. 5 is an example diagram showing result values of the components of FIG. 3.

Referring to FIG. 3, the error detector 200 according to at least one embodiment of the present disclosure includes an n-gram generation unit 210, a search unit 220, a suitability calculation unit 230, and an error determination unit 240. Other components of the error detector 200, such as the n-gram generation unit 210, the search unit 220, the suitability calculation unit 230, and the error determination unit 240 are implemented by one or more processors and/or application-specific integrated circuits (ASICs).

The n-gram generation unit 210 generates morpheme sequences by binding morphemes in an arbitrary window size in one or more directions of a forward direction and a backward direction. In particular, the n-gram generation unit 210 according to the present disclosure may separately generate forward morpheme sequences by binding morphemes arranged in the forward direction from respective morphemes in an arbitrary window size and backward morpheme sequences by binding morphemes arranged in the backward direction in an arbitrary window size.

For example, as shown in (d) of FIG. 4, it is possible to generate morpheme sequences by binding morphemes (I, would, like, to) arranged in the backward direction from the morpheme "live" in an arbitrary window size. At this time, it is possible to generate backward morpheme sequences obtained by binding the morphemes in a 2-window unit, a 3-window unit, a 4-window unit, and a 5-window unit as "to live," "like to live," "would like to live," and "I would like to live," respectively.

On the other hand, as shown in (e), it is possible to generate morpheme sequences by binding morphemes (live, in, the, city, .) arranged in the forward direction from the morpheme "live" in an arbitrary window size. At this time, it is possible to generate forward morpheme sequences obtained by binding the morphemes in a 2-window unit, a 3-window unit, a 4-window unit, and a 5-window unit as "live in," "live in the," "live in the city," and "live in the city.," respectively.

Here, the n-gram generation unit 210 may have set a window size in advance, and may generate a morpheme sequence corresponding to the set window size and use the generated morpheme sequence for error detection. For detailed detection, it is preferable to generate respective morpheme sequences while changing the window size to a bi-gram, a tri-gram, etc., and analyze the generated morpheme sequences. However, in this case, the capacity of morpheme sequences stored in the index DB 250 remarkably increases, and analysis may be complicated. Therefore, it is also possible to generate and analyze morpheme sequences in only one window size.

The search unit 220 searches whether morpheme sequences identical to the morpheme sequences generated by the n-gram generation unit 210 are in the example-based index DB 250 built with many pieces of example text, according to respective morphemes included in input sentences.

The suitability calculation unit 230 extracts the frequencies of appearance of morpheme sequences identical to the generated morpheme sequences, and calculates suitability based on the extracted frequencies of appearance. Suitability is a score indicating the frequency of appearance of each morpheme in morpheme sequences. When there are both forward and backward morpheme sequences generated by the n-gram generation unit 210, the suitability calculation unit 230 may separately calculate respective scores of suitability of one morpheme for morpheme sequences in one or more directions of the forward direction and the backward direction, and calculate an integrated suitability by integrating the respective scores of suitability.

In addition, when calculating suitability for a forward morpheme sequence and a backward morpheme sequence, the suitability calculation unit 230 may apply different weights according to the frequencies of appearance at which respective morphemes are identically arranged in morpheme sequences. For example, when there are the backward morpheme sequence "live in" obtained by binding morphemes in a 2-window unit, the backward morpheme sequence "live in the" obtained by binding morphemes in a 3-window unit, the backward morpheme sequence "live in the city" obtained by binding morphemes in a 4-window unit, etc., higher weights are given to morpheme sequences corresponding to larger numbers of windows, so that suitability may be determined with reference to more information. In other words, the suitability calculation unit 230 calculates suitability scores using high frequencies of appearance, and detects grammatical errors by determining whether the suitability scores are smaller than a threshold or whether the suitability scores are smaller than the threshold by a predetermined value or more.

The error determination unit 240 detects an error section by determining whether there is a section in which a suitability score is lower than a threshold or is drastically reduced by a predetermined value or more. At this time, the error determination unit 240 may separately construct the graphs of suitability in the forward direction, suitability in the backward direction, and integrated suitability. Also, the error determination unit 240 determines the respective frequencies of appearance of forward morpheme sequences and backward morpheme sequences of the generated morpheme sequences by searching the example-based index DB 250, and detects errors based on high frequencies of appearance when frequencies of appearance of the forward morpheme sequences are different from frequencies of appearance of the backward morpheme sequences.

FIG. 5 is an example diagram showing result values of the components of FIG. 3. Referring to the example shown in FIG. 5, FIG. 5's (a) is an input sentence, and FIG. 5's (b) shows suitability of the input sentence calculated according to respective morphemes. score_f(Wm) shown in FIG. 5's (b) is forward suitability indicating a frequency of which each morpheme may be arranged with forward morpheme sequences, score_b(Wm) is backward suitability indicating a frequency of which each morpheme may be arranged with backward morpheme sequences, and score(Wm) is integrated suitability obtained by averaging forward suitability and backward suitability. "Wm" indicates a weight of morpheme in morpheme sequences. In FIG. 5's (b), each score of score_f(Wm) is a suitability score indicating frequency of binding each morpheme in morpheme sequences (i.e., an input sentence od FIG. 5's (a)) with first morpheme "I" in the input sentence FIG. 5's (a). And, each score of score_f (Wm) is calculated in forward direction based on the first morpheme "I" in the input sentence of FIG. 5's (a). In FIG. 5's (b), each score of score_b(Wm) is a suitability score indicating frequency of binding each morpheme in morpheme sequences (i.e., an input sentence od FIG. 5's (a)) with the last morpheme "city" in the input sentence FIG. 5's (a). And, each score of score_b(Wm) is calculated in backward direction based on the last morpheme "city" in the input sentence of FIG. 5's (a).

Figure 6:
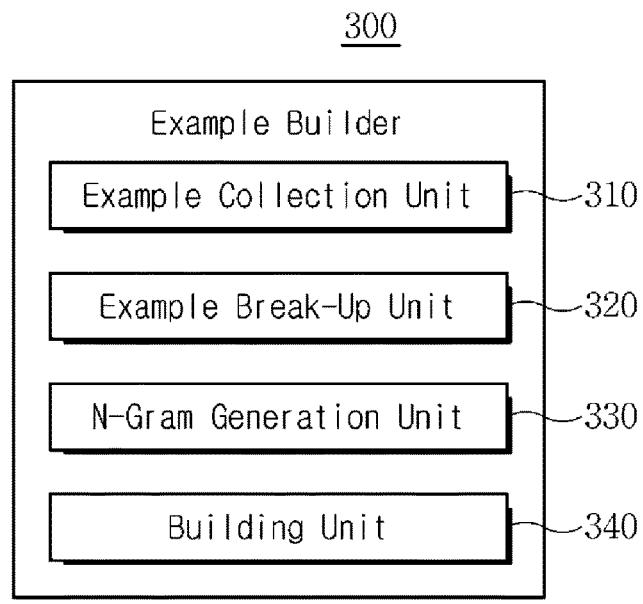
FIG. 6 is a diagram of a constitution of an example builder according to at least one embodiment of the present disclosure.

FIG. 6 is a diagram showing a constitution of an example builder according to at least one embodiment of the present disclosure.

Referring to FIG. 6, the example builder 300 includes an example collection unit 310, an example break-up unit 320, an n-gram generation unit 330, and a building unit 340.

The example collection unit 310 collects example text from enormous sentence sets exposed through language transmission media, such as the Internet, news, and newspaper articles. At this time, it is assumed that the example text includes sentences used in real life, sentences including various styles of writing, and so on. News and newspaper articles are used because there are a smaller number of sentence errors than in other media.

The example collection unit 310 may have input keywords desired to be collected in advance, and automatically collect example text in which the input keywords are used while monitoring sentence sets exposed through the language transmission media.

The example break-up unit 320 breaks up the example text collected by the example collection unit 310 into units of morphemes. Here, sentence break-up denotes an operation of breaking up example text having several sentences into units of sentences based on punctuation marks, such as a period, a question mark, and an exclamation mark. Also, morpheme break-up denotes an operation of breaking up the respective pieces of example text broken up into units of sentences into units of morphemes.

The n-gram generation unit 330 generates morpheme sequences by binding the morphemes broken up by the example break-up unit 320 in an arbitrary window size. At this time, the morpheme sequences are generated by binding the morphemes in an arbitrary window size in one or more directions of the forward direction and the backward direction from the respective morphemes. For example, from the example text "I want to go to school.," using a 3-window unit, the morpheme sequence "I want to" may be generated based on the morpheme "I," the morpheme sequences "want to go" and "(null) I want" may be generated based on the morpheme "want," and the morpheme sequences "to go to" and "I want to" may be generated based on the morpheme "to." This is intended to store the example text in its entirety and also in units of morpheme sequences when the index DB 250 is built.

The building unit 340 matches the morpheme sequences generated by the n-gram generation unit 330 with the corresponding example text, and stores the morpheme sequences and the corresponding example text in the index DB 250.

Figure 7:
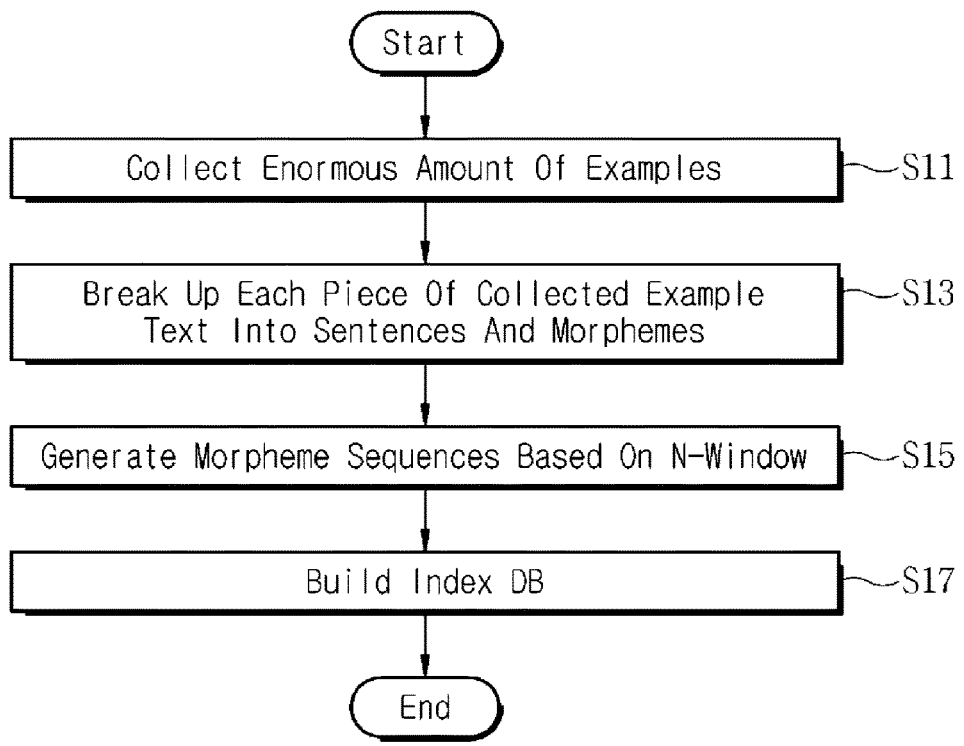
FIG. 7 is a flowchart of a method of building an example-based database (DB) to detect a grammatical error according to at least one embodiment of the present disclosure.

FIG. 7 is a flowchart illustrating a method of building an example-based DB to detect a grammatical error according to at least one embodiment of the present disclosure.

Referring to FIG. 7, in step S11, the example collection unit 310 of the example builder 300 according to at least one embodiment of the present disclosure collects desired example text from enormous data sets exposed through language transmission media, such as the Internet, news, and newspaper articles. At this time, if keywords desired to be collected have been input in advance to collect desired example text, when there is example text in which an input keyword is used, it is possible to automatically collect the example text while monitoring sentence sets exposed through the language transmission media.

Subsequently, in step S13, the example break-up unit 320 of the example builder 300 breaks up each piece of the example text collected by the example collection unit 310 into morphemes. In step S15, the n-gram generation unit 330 of the example builder 300 generates morpheme sequences by binding morphemes based on respective morphemes in an arbitrary window size.

In step S17, the building unit 340 of the example builder 300 matches the morpheme sequences generated in the previous step with the corresponding example text and stores the morpheme sequences and the corresponding example text in the index DB 250.

Figure 8:
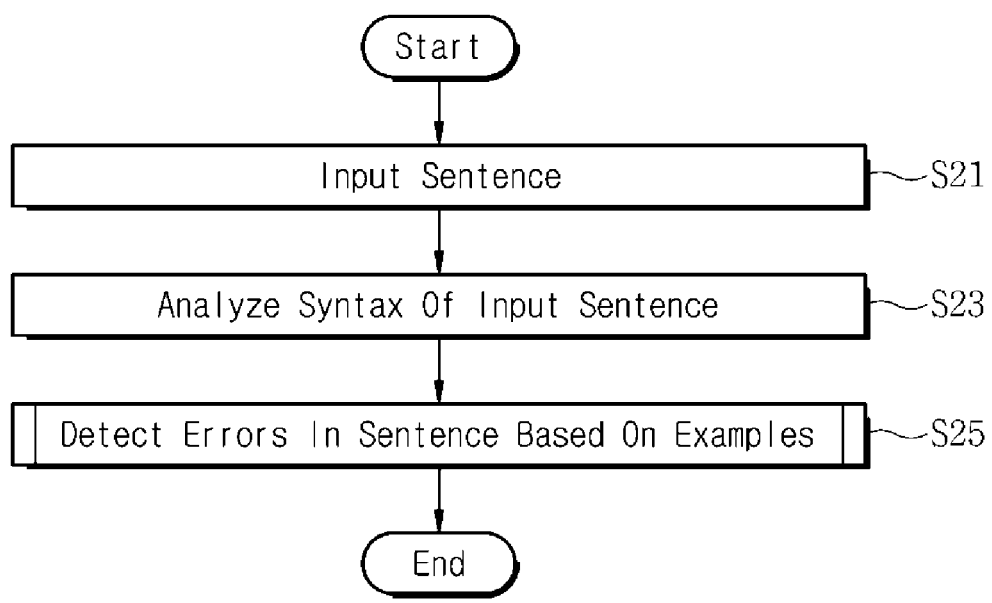
FIG. 8 is a flowchart of a method of detecting a grammatical error according to at least one embodiment of the present disclosure.

FIG. 8 is a flowchart illustrating a method of detecting a grammatical error according to at least one embodiment of the present disclosure.

Referring to FIG. 8, in step S21, the error detecting apparatus 10 according to at least one embodiment of the present disclosure receives an input sentence, and breaks up the input sentence into a plurality of morphemes. Here, the error detecting apparatus 10 generates morpheme sequences by binding the morphemes broken up from the input sentence in an arbitrary window (n-window) size. Also, the error detecting apparatus 10 tags the morphemes with the corresponding parts of speech based on the part-of-speech dictionary 130.

Then, in step S23, the error detecting apparatus 10 performs syntax analysis of the broken-up sentence based on the tagged parts of speech, and extracts a syntax tree as a result of the analysis. Here, the error detecting apparatus 10 transfers the sentence tagged with the parts of speech to the error detector 200 so as to reduce as many errors in syntax analysis as possible.

In step S35, the example builder 300 of the error detecting apparatus 10 detects errors in the input sentence input from the sentence analyzer 100 using the example-based index DB 250 built by the example builder 300. In particular, the error detecting apparatus 10 determines the frequencies of appearance of morpheme sequences identical to forward morpheme sequences and backward morpheme sequences of the generated morpheme sequences by searching the example-based index DB 250. Here, the error detecting apparatus 10 calculates suitability scores using higher frequencies of appearance, and detects errors by determining whether the suitability scores are smaller than a threshold or whether the suitability scores are smaller than the threshold by a predetermined value or more. Then, when the frequencies of appearance of the forward morpheme sequences are different from the frequencies of appearance of the backward morpheme sequences, the error detecting apparatus 10 may detect the errors based on higher frequencies of appearance.

Figure 9:
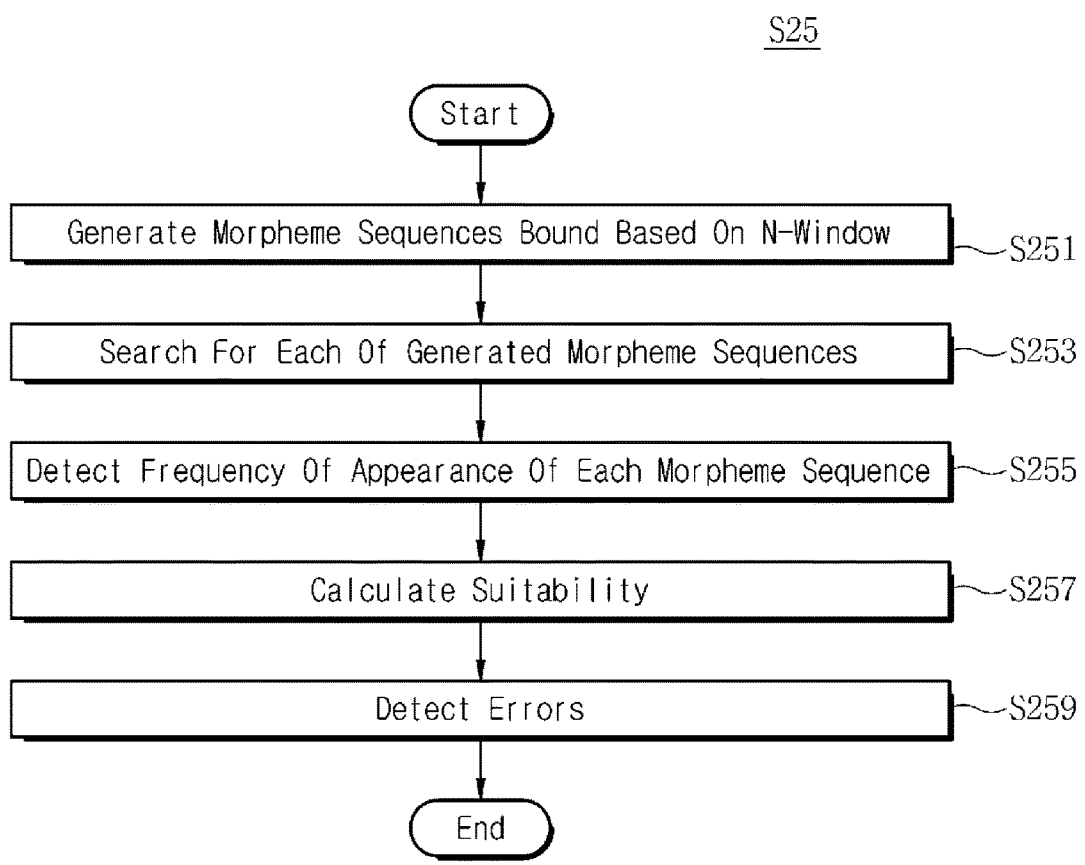
FIG. 9 is a detailed diagram of the error detecting process of FIG. 8.

FIG. 9 is a detailed diagram of the error detecting process of FIG. 8.

Referring to FIG. 9, specifically, the error detecting step (S25) in which the error detector 200 is used includes step S251 in which the error detector 200 generates morpheme sequences by binding the respective morphemes of the input sentence in a predetermined window size. As described above, it is possible to separately generate uni-directional or multi-directional morpheme sequences among the forward morpheme sequences obtained by binding morphemes in the forward direction from the respective morphemes and the backward morpheme sequences obtained by binding morphemes in the backward direction from the respective morphemes. Subsequently, in step S253, the error detector 200 searches whether each of the generated morpheme sequences is in the example-based index DB 250.

In step S255, the error detector 200 extracts the frequencies of appearance of morpheme sequences identical to the generated morpheme sequences. Then, in step S257, the error detector 200 calculates suitability based on the extracted frequencies of appearance. Here, suitability is a score indicating the degree of suitability of arrangement of each morpheme with the corresponding morpheme sequence, and the calculation method thereof is the same as described above.

Subsequently, in step S259, the error detector 200 constructs a graph from the calculated suitability scores, and may detect errors using the constructed graph. In other words, by determining whether the suitability score are smaller than a threshold or whether the suitability scores are drastically reduced by a predetermined value or more, error sections (i.e., grammatical errors) are detected. In particular, the error detector 200 calculates the suitability scores using higher frequencies of appearance, and detects errors by determining whether the suitability scores are smaller than the threshold or whether the suitability scores are smaller than the threshold by the predetermined value or more. Meanwhile, when the frequencies of appearance of the forward morpheme sequences are different from the frequencies of appearance of the backward morpheme sequences, the error detector 200 may detect the errors based on higher frequencies of appearance.

According to some embodiments of the present disclosure, sentences (example text) are collected and constructed based on natural representations rather than standardized rules of a language, an input sentence is analyzed based on the collected and constructed sentences to detect an error, and correctives to the error are proposed as occasion demands, so that the performance of writing evaluation can be improved. In addition, an example-based technique has been used for existing machine translation in the field of natural language processing, and a method of extracting translation knowledge from examples of numerous pairs of original text and its translation and performing automatic translation based on the translation knowledge is applied. The example-based technique applied to machine translation uses a large amount of examples, and thus can be used for a high-quality translation function. In particular, since languages naturally vary with time and place rather than being rules, some embodiments of the present disclosure provide advantageous effect to easily apply a pattern that people frequently use without continuously generating complex rules.

A method of detecting a grammatical error according to the present disclosure can be implemented in the form of software readable by various computing means and recorded in a non-transitory computer-readable recording medium. Here, the non-transitory computer-readable recording medium can separately include program instructions, data files, data structures, etc. or include a combination thereof. The program instructions recorded in the recording medium is program instructions that are specially designed and configured for the present disclosure, as understood by those of ordinary skill in the art in view of the present disclosure. Examples of the recording medium include magnetic media, such as a hard disk, a floppy disk, and a magnetic tape, optical media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory. The examples of the program instructions include not only machine language code generated by a compiler, but also high-level language code that can be executed by a computer using an interpreter, and so on. The above-described hardware devices may be configured to operate as one or more software modules in order to perform the operation of the present disclosure, and vice versa.

In this specification, exemplary embodiments of the present disclosure have been classified into the first, second and third exemplary embodiments and described for conciseness. However, respective steps or functions of an exemplary embodiment can be combined with those of another exemplary embodiment to implement still another exemplary embodiment of the present disclosure.

Exemplary embodiments of the present disclosure disclosed in the drawings and specification are merely presented specific examples for better understanding, and are not intended to limit the spirit and scope of the claimed invention. Specific terms used in this disclosure and drawings are used for illustrative purposes and not to be considered as limitations of the present disclosure. Exemplary embodiments of the present disclosure have been described for the sake of brevity and clarity. In addition to exemplary embodiments disclosed herein, it will be obvious by those skilled in the art that various changes in form and details are made therein without departing from the spirit and scope of the claimed invention.

What is claimed is:

1. A non-transitory computer-readable recording medium storing a program for executing a method for detecting grammatical errors, the program, when executed by a processor included in an apparatus for detecting grammatical errors, causing the processor to execute:

breaking up an input sentence into units of morphemes;

generating morpheme sequences by binding the broken-up morphemes in a preset window size set by the processor, the generated morpheme sequences comprising forward morpheme sequences and backward morpheme sequences;

determining frequencies of appearance of morpheme sequences identical to forward morpheme sequences and backward morpheme sequences of the generated morpheme sequences by searching an example-based index database (DB); and detecting grammatical errors in the input sentence by combining the determined frequencies of appearance.

2. The non-transitory computer-readable recording medium of claim 1, wherein the generating of the morpheme sequences comprises
generating (i) the forward morpheme sequences by binding morphemes arranged in a forward direction from the respective morphemes broken up from the input sentence in the preset window size, and (ii) the backward morpheme sequences by binding morphemes arranged in a backward direction from the respective morphemes broken up from the input sentence in the preset window size.

3. The non-transitory computer-readable recording medium of claim 2, wherein the detecting of the errors comprises:
searching whether or not the generated morpheme sequences are in the example-based index DB;
extracting the frequencies of appearance at which the forward morpheme sequences and the backward morpheme sequences are identical to morpheme sequences retrieved from the example-based index DB, and calculating suitability scores based on the extracted frequencies of appearance; and
detecting grammatical errors by determining whether the calculated suitability scores are smaller than a threshold or whether the calculated suitability scores are smaller than the threshold by a predetermined value or more.

4. The non-transitory computer-readable recording medium of claim 3, wherein the calculating of the suitability scores comprises
calculating respective suitability scores based on the frequencies of appearance of the forward morpheme sequences and the backward morpheme sequences, and
calculating the suitability scores in an integrated manner by considering the respective suitability scores.

5. The non-transitory computer-readable recording medium of claim 3, wherein the calculating of the suitability scores comprises
calculating the suitability scores by applying different weights according to frequencies of appearance at which the respective morphemes are identically arranged in the morpheme sequences retrieved from the example-based index DB.

6. The non-transitory computer-readable recording medium of claim 1, wherein the detecting of the errors comprises
when frequencies of appearance of the forward morpheme sequences are different from frequencies of appearance of the backward morpheme sequences, detecting the errors based on higher frequencies of appearance among frequencies of appearance of the forward morpheme sequences and the backward morpheme sequences.

7. The non-transitory computer-readable recording medium of claim 6, wherein the detecting of the grammatical errors based on the higher frequencies of appearance comprises:
calculating suitability scores using the higher frequencies of appearance; and
detecting the grammatical errors by determining whether the suitability scores are smaller than a threshold or whether the suitability scores are smaller than the threshold by a predetermined value or more.

8. An apparatus for detecting grammatical errors, the apparatus comprising:
a sentence analyzer, implemented by a processor s and/or application-specific integrated circuits (ASICs), configured to break up an input sentence into units of morphemes;
an example builder, implemented by one or more processors and/or application-specific integrated circuits (ASICs), configured to break up example text into units of morphemes and build an example-based index database (DB); and
an error detector, implemented by one or more processors and/or application-specific integrated circuits (ASICs), configured to
generate morpheme sequences by binding the morphemes broken up from the input sentence in a preset window (n-window) size, the generated morpheme sequences comprising forward morpheme sequences and backward morpheme sequences,
determine frequencies of appearance of morpheme sequences identical to the forward morpheme sequences and backward morpheme sequences by searching the example-based index DB, and
detect grammatical errors in the input sentence by combining the determined frequencies of appearance.

9. The apparatus of claim 8, wherein the error detector comprises:
an n-gram generation unit configured to generate the forward and backward morpheme sequences by binding morphemes arranged in a forward direction and a backward direction, respectively, from the respective morphemes broken up from the input sentence in the preset window size;
a search unit configured to search whether the forward morpheme sequences and the backward morpheme sequences generated by the n-gram generation unit are in the example-based index DB;
a suitability calculation unit configured to extract the frequencies of appearance at which the forward morpheme sequences and the backward morpheme sequences generated by the n-gram generation unit are identical to morpheme sequences retrieved by the search unit, and calculate suitability scores based on the extracted frequencies of appearance; and
an error determination unit configured to detect grammatical errors by determining whether the suitability scores calculated by the suitability calculation unit are smaller than a threshold or whether the suitability scores are smaller than the threshold by a predetermined value or more.

10. The apparatus of claim 9, wherein the suitability calculation unit is configured to
calculate respective suitability scores of the forward morpheme sequences and the backward morpheme sequences generated by the n-gram generation unit, and
calculate the suitability scores in an integrated manner by considering the calculated respective suitability scores.

11. The apparatus of claim 9, wherein the suitability calculation unit is configured to calculate the suitability scores by applying different weights according to frequencies of appearance at which respective morphemes are identically arranged in the morpheme sequences retrieved by the search unit.

12. The apparatus of claim 8, wherein, when frequencies of appearance of the forward morpheme sequences are different from frequencies of appearance of the backward morpheme sequences, the error detector is configured to detect the grammatical errors in the sentence based on higher frequencies of appearance among the frequencies of appearance of the forward morpheme sequences and the frequencies of the backward morpheme sequences.

13. The apparatus of claim 12, wherein the error detector is configured to calculate suitability scores using the higher frequencies of appearance, and detects grammatical errors by determining whether the suitability scores are smaller than a threshold or whether the suitability scores are smaller than the threshold by a predetermined value or more.

14. A method performed by an apparatus for detecting grammatical errors, the apparatus including a processor to execute the method comprising:
 breaking up an input sentence into units of morphemes;
 generating morpheme sequences by binding the broken-up morphemes in an preset window size set by the processor, the generated morpheme sequences comprising forward morpheme sequences and backward morpheme sequences;
 determining frequencies of appearance of morpheme sequences identical to the forward morpheme sequences and backward morpheme sequences of the generated morpheme sequences by searching an example-based index database (DB); and
 detecting grammatical errors in the input sentence by combining the determined frequencies of appearance.

15. The method of claim 14, wherein the generating of the morpheme sequences comprises
 generating (i) the forward morpheme sequences by binding morphemes arranged in a forward direction from the respective morphemes broken up from the input sentence in the preset window size, and (ii) the backward morpheme sequences by binding morphemes arranged in a backward direction from the respective morphemes broken up from the input sentence in the preset window size.

16. The method of claim 15, wherein the detecting of the errors comprises:
 searching whether or not the generated morpheme sequences are in the example-based index DB;
 extracting the frequencies of appearance at which the forward morpheme sequences and the backward morpheme sequences are identical to morpheme sequences retrieved from the example-based index DB, and calculating suitability scores based on the extracted frequencies of appearance; and
 detecting grammatical errors by determining whether the calculated suitability scores are smaller than a threshold or whether the calculated suitability scores are smaller than the threshold by a predetermined value or more.

17. The method of claim 16, wherein the calculating of the suitability scores comprises
 calculating respective suitability scores based on the frequencies of appearance of the forward morpheme sequences and the backward morpheme sequences, and
 calculating the suitability scores in an integrated manner by considering the calculated respective suitability scores.

18. The method of claim 16, wherein the calculating of the suitability scores comprises
 calculating the suitability scores by applying different weights according to frequencies of appearance at which the respective morphemes are identically arranged in the morpheme sequences retrieved from the example-based index DB.

19. The method of claim 14, wherein the detecting of the errors comprises
 when frequencies of appearance of the forward morpheme sequences are different from frequencies of appearance of the backward morpheme sequences, detecting the errors based on higher frequencies of appearance among frequencies of appearance of the forward morpheme sequences and the backward morpheme sequences.

20. The method of claim 19, wherein the detecting of the grammatical errors based on the higher frequencies of appearance comprises:
 calculating suitability scores using the higher frequencies of appearance; and
 detecting the grammatical errors by determining whether the suitability scores are smaller than a threshold or whether the suitability scores are smaller than the threshold by a predetermined value or more.

* * * * *